(12) United States Patent
Sakoske et al.

(10) Patent No.: US 6,171,383 B1
(45) Date of Patent: Jan. 9, 2001

(54) BISMUTH MANGANESE OXIDE GREEN PIGMENTS

(75) Inventors: George Emil Sakoske; Joseph E. Sarver, both of Washington, PA (US)

(73) Assignee: Cerdec Aktiengesellschaft Keramische Farben, Frankfurt (DE)

( * ) Notice: Under 35 U.S.C. 154(b), the term of this patent shall be extended for 0 days.

(21) Appl. No.: 09/441,785

(22) Filed: Nov. 17, 1999

Related U.S. Application Data

(63) Continuation-in-part of application No. 09/215,498, filed on Dec. 18, 1998.

(51) Int. Cl.$^7$ .................................. C09C 1/00; C09C 1/62
(52) U.S. Cl. ......................... 106/479; 106/400; 106/401; 428/426; 428/428; 501/17
(58) Field of Search .................................. 106/400, 401, 106/479; 428/426, 428; 501/17; 423/605, 617

(56) References Cited

U.S. PATENT DOCUMENTS

| | | | |
|---|---|---|---|
| 3,673,229 | * | 6/1972 | Rinse ..................................... 260/429 |
| 5,336,312 | * | 8/1994 | Byrne et al. .......................... 106/479 |
| 5,747,395 | * | 5/1998 | Smith et al. ............................. 501/5 |

OTHER PUBLICATIONS

Tutov et al. "New Compounds in the Systems Bi2O3–Me2O3 (Fe, Al, Ga, Mn)", Soviet Physics–Solid State, Oct. 1964, pp. 963–964, vol. 6, No. 4.*
Badikova et al. "Oxidative Dehydromerization of Methane on Bi–Mn Oxides: Catalysts Active Component and Reaction Mechanism", Catalysts Today, Jun. 1992, pp. 511–516, vol. 13.*
Badikova et al., "Characterization of bismuth–manganese oxide catalysts for methane oxidative coupling", Appl. Catal., Mar. 1992, pp. 169–182, vol. 89.*

* cited by examiner

*Primary Examiner*—Mark L. Bell
*Assistant Examiner*—Michael J. DiVerdi
(74) *Attorney, Agent, or Firm*—Alan G. Towner; Eckert Seamans Cherin & Mellott, LLC

(57) ABSTRACT

Bismuth manganese oxide green pigments are used as additives to various materials such as plastics, plastic or organic coating compositions, glass and ceramic coating compositions, and the like. The green bismuth manganese oxide pigments preferably comprise $Bi_{12}MnO_{20}$ crystallized in the cubic crystal structure. The pigments possess improved reflectance characteristics, particularly in the IR region, and may reduce IR-induced heat buildup.

29 Claims, 2 Drawing Sheets

BISMUTH MANGANESE OXIDE GREEN PIGMENTS

CROSS REFERENCE TO RELATED APPLICATION

This application is a continuation-in-part of U.S. application Ser. No. 09/215,498 filed Dec. 18, 1998, which is incorporated herein by reference.

FIELD OF THE INVENTION

The present invention relates to pigments for plastics, glasses and other types of materials, and more particularly relates to bismuth manganese oxide green pigments.

BACKGROUND INFORMATION

Pigments are widely used in various applications such as paints, inks, plastics, rubbers, ceramics, enamels and glasses. For example, U.S. Pat. No. 5,336,612 to Byrne et al. discloses bismuth-containing colorants.

SUMMARY OF THE INVENTION

The present invention provides bismuth manganese oxide green pigments which may be used as additives to plastics, plastic or organic coating compositions, textiles, glass and ceramic coating compositions, and the like. The bismuth manganese oxide green pigments preferably comprise $Bi_{12}MnO_{20}$ having a cubic crystal structure. The pigments provide improved heat buildup properties.

The bismuth manganese oxide green pigments of the present invention may be used in many applications such as automotive and marine paints, and colored plastics such as vinyl siding, where one property of the bismuth manganese oxide pigments is very high infrared reflectance. These infrared reflective properties exhibit much less heat buildup and much higher infrared radiation reflectance in comparison with commercial pigments.

Compositions including the present bismuth manganese oxide green pigments also have advantages in architectural, container, and other glass or ceramic decorative applications where reduced heat buildup is desired.

Another property exhibited by the present bismuth manganese oxide green pigments is the ability to render a surface markable when exposed to a laser, allowing the formation of a high contrast mark with minimal disruption of the surface. Some laser marking uses would be in plastics, organic coatings, metal marks, and any other type of similar mark which can be made readable by interaction with the laser beam.

An aspect of the present invention is to provide a pigment comprising bismuth manganese oxide. The bismuth manganese oxide preferably comprises $Bi_{12}MnO_{20}$ having a cubic crystal structure.

Another aspect of the present invention is to provide a coating composition including a liquid carrier and a pigment comprising green bismuth manganese oxide dispersed therein.

A further aspect of the present invention is to provide an enamel composition comprising glass frit and bismuth manganese oxide green pigment.

Another aspect of the present invention is to provide an article including a substrate matrix and bismuth manganese oxide green pigment dispersed in the matrix.

A further aspect of the present invention is to provide an article including a substrate and a coating comprising a bismuth manganese oxide green pigment covering at least a portion of the substrate.

Another aspect of the present invention is to provide a method of making a bismuth manganese oxide green pigment. The method includes the steps of mixing powders of bismuth oxide and manganese oxide and calcining the mixture.

A further aspect of the present invention is to provide a method of coloring a substrate. The method includes the steps of providing a substrate, and adding a bismuth manganese oxide green pigment to the substrate. The bismuth manganese oxide green pigment may be dispersed in the substrate or coated on the substrate.

These and other aspects of the present invention will be more apparent from the following description.

DETAILED DESCRIPTION

Figure 1:
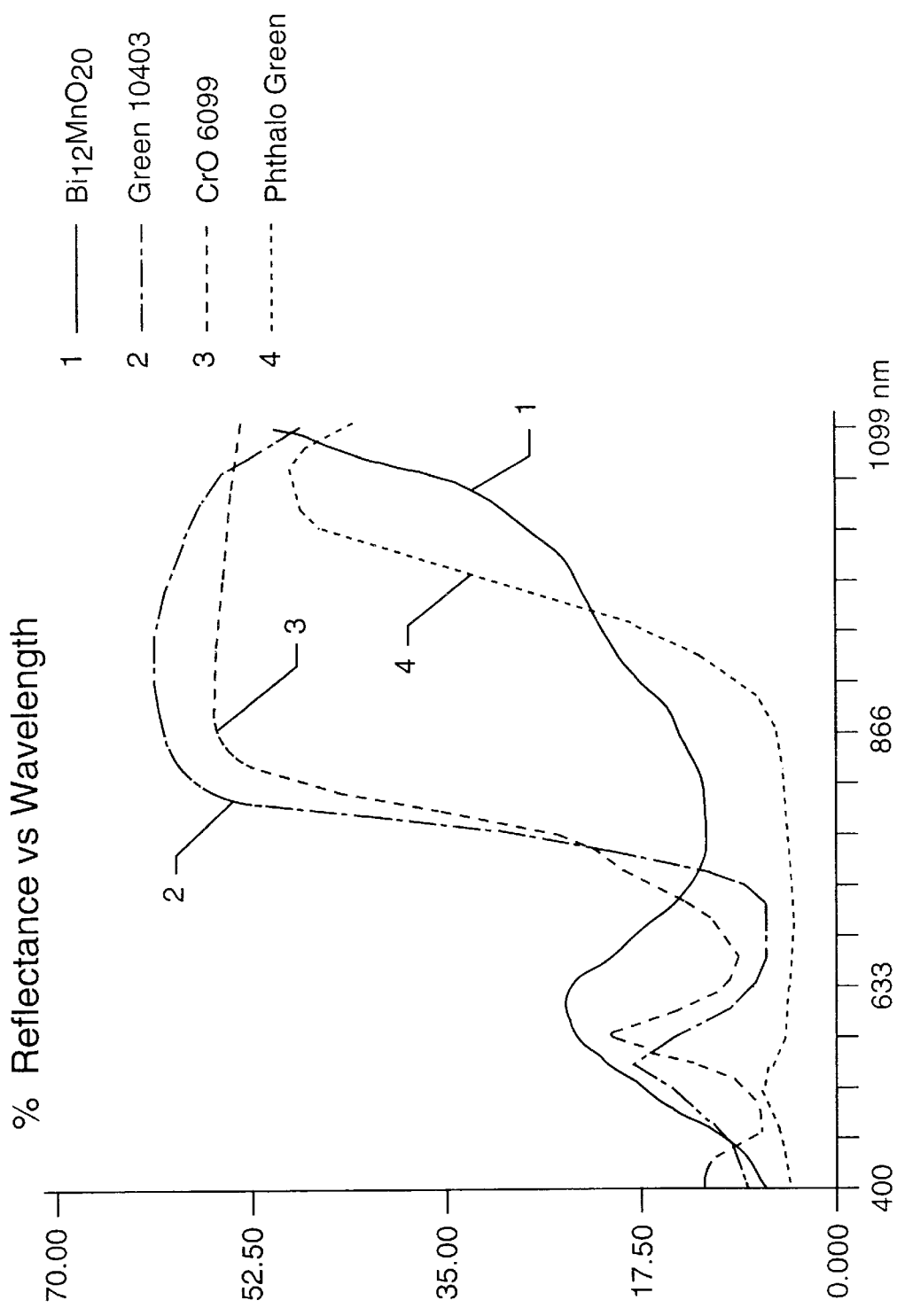
FIG. 1 is a graph illustrating visible and infrared reflectance characteristics at wavelengths of up to 1,100 nm for a bismuth manganese oxide green pigment of the present invention in comparison with conventional green pigments.

This invention relates to the use of bismuth manganese oxide as a green pigment. The bismuth manganese oxide green pigment preferably comprises $Bi_{12}MnO_{20}$ crystallized in the cubic crystal structure, as demonstrated by standard X-ray diffraction techniques. The present bismuth manganese oxide green pigments are useful in many applications, including organic chemical compositions such as plastics, rubbers, and the like, coating compositions such as paints, printing inks, and the like, and inorganic chemical compositions such as glass enamels, porcelain enamels, and the like.

The bismuth manganese oxide green pigments have been found to impart unique properties such as high infrared (IR) reflectance. While not intending to be bound by theory, it is believed that the present bismuth manganese oxide green pigment may impart such unique properties due to the electronic structure of the molecule and the interaction of this electronic structure with infrared light energy.

The present bismuth manganese oxide green pigments preferably have average particle sizes of from about 0.1 to about 20 microns, more preferably from about 0.5 to about 5 microns.

The bismuth manganese oxide green pigments may be formed by processes such as sol-gel and chemical precipitation. A particularly preferred process for making the present bismuth manganese oxide green pigments is to mix bismuth oxide and manganese oxide powders, followed by calcination. In this embodiment, the mixed powders are preferably calcined at temperatures of from about 700 to about 800° C., more preferably from about 720 to about 750° C. Calcination times of from about 3 to about 100 hours are preferred, more preferably from about 5 to about 50 hours.

In a preferred embodiment of the present invention, the bismuth manganese oxide pigment comprises $Bi_{12}MnO_{20}$. However, a stoichiometric excess of either Bi or Mn may be present in the pigment. The pigment composition may be formed, for example, by mixing powders of $Bi_2O_3$ and $MnO_2$ in the appropriate ratio to form the desired composition, followed by calcining. For instance, 97 weight percent $Bi_2O_3$ and 3 weight percent $MnO_2$ may be mixed and calcined to form $Bi_{12}MnO_{20}$. The ratio of $Bi_2O_3$ to $MnO_2$, or the ratio of other Bi-containing and Mn-containing compositions, may be adjusted in order to achieve the desired bismuth manganese oxide composition.

Plastic or rubber compositions to which the present bismuth manganese oxide green pigments may be added in accordance with this invention include polymeric materials that are natural or synthetic. Examples include natural resins, rubber, chlororubber, casein, oil-modified alkyd resins, viscose, cellulose acetate, cellulose propionate, cellulose acetobutyrate, nitrocellulose, or other cellulose ethers or esters. Synthetic organic polymers produced by polymerization, polyaddition, or polycondensation in thermosetting or thermoplastics can also be colored by this invention. Examples are polyethylene, polystyrene, polypropylene, polyisobutylene, polyvinylchloride, polyvinylacetate, polyacrylonitrile, poly acrylic acid, other polyolefins and substituted polyolefins, as well as methyacrylic acid esters, butadiene, as well as copolymers of the above mentioned. Examples from polyaddition and polycondensation resins are the condensation products of formaldehyde with phenols, phenolic resins, urea, thiourea, and melamine, amino resins, polyesters, polyamides, polycarbonates, and/or silicones. These polymers can be present individually or as mixtures as plastic material or melts spun into fibers. They can also be dissolved as film formers or binders for lacquers, paints, or printing inks such as linseed oil, nitrocellulose, melamine resins, acrylic resins, ureaformaldehyde resins and the like.

In an embodiment of the present invention, a glass-ceramic enamel composition is provided comprising from about 0.1 to about 70 weight percent of the bismuth manganese oxide green pigment and from about 30 to about 99.9 weight percent solids of glass frit compositions, a combination of two or more frits, alkali silicate, colloidal silica, or organic silicate, titinate, zirconate or other. Additional oxide pigments may be added to the compositions such as $CuCr_2O_4$, $(Co,Fe)(Fe,Cr)_2O_4$, silica, alumina, wollastanite, feldspar, titania, and the like.

As used herein, the term "glass frit" means pre-fused glass material which is typically produced by rapid solidification of molten material followed by grinding or milling to the desired powder size. Preferred glass frits may comprise from 0 to about 75 weight percent lead oxide, from 0 to about 75 weight percent bismuth oxide, from 0 to about 75 weight percent silica, from 0 to about 50 weight percent zinc oxide, from 0 to about 40 weight percent boron oxide, from 0 to about 15 weight percent aluminum oxide, from 0 to about 15 weight percent zirconium oxide, from 0 to about 8 weight percent titanium oxide, from 0 to about 20 weight percent phosphorous oxide, from 0 to about 15 weight percent calcium oxide, from 0 to about 10 weight percent manganese oxide, from 0 to about 7 weight percent copper oxide, from 0 to about 5 weight percent cobalt oxide, from 0 to about 15 weight percent iron oxide, from 0 to about 20 weight percent sodium oxide, from 0 to about 20 weight percent potassium oxide, from 0 to about 15 weight percent lithium oxide and from 0 to about 7 weight percent fluoride, as well as other oxides conventionally used in glass frit compositions. Encapsulation of the pigment in a protective shell may be necessary to protect the pigment in a glass-ceramic.

In addition to solid mixtures, the present bismuth manganese oxide green pigments may be provided in liquid or paste form. Suitable liquid carriers for the bismuth manganese oxide pigments include pine oils, vegetable oils, mineral oils, low molecular weight petroleum fractions, tridecyl alcohols, synthetic resins and natural resins. When used in paints for architectural, automotive, marine and other applications, the bismuth manganese oxide pigment preferably comprises from about 0.1 to about 50 weight percent of the liquid paint composition, more preferably from about 1 to about 30 weight percent. For example, latex architectural paints preferably comprise from about 0.5 to about 50 weight percent of the bismuth manganese oxide pigments, with the remainder of the paint comprising water, resin and solvents. Oil-based paints preferably comprise from about 0.5 to about 50 weight percent of the present bismuth manganese oxide green pigments, with the remainder comprising organic solvents, resin and additives.

In a particular embodiment, a printable enamel paste comprises from about 60 to about 85 weight percent of the above-listed glass-ceramic enamel solid powder mixture, plus from about 15 to about 40 weight percent of a suitable carrying vehicle or medium which can be applied on a substrate by screen printing, roll coating or spraying.

In a further embodiment, a substrate may be coated with the above glass-ceramic enamel composition, and then fired. The substrate may comprise, for example, automotive glass, architectural glass, container glass, metal or the like.

The use of the present bismuth manganese oxide green pigments in coatings or materials such as carbon-carbon composites may also be advantageous with regard to IR reflection characteristics. As used herein, the term "IR reflectance" means the reflectance properties of a material at wavelengths above about 700 nm. The IR wavelengths include near-IR (750–2,000 nm), mid-IR (2,000–4,000 nm), and far-IR (4,000–5,500 nm). Articles coated with or containing the present pigments preferably have an IR reflectance of greater than about 50 percent at a wavelength of 1,100 nm. Such articles also preferably maintain an IR reflectance of greater than about 50 percent at higher wavelengths, e.g., up to 2,500 nm. Plastic, rubber, paint and other compositions incorporating the present $Bi_{12}MnO_{20}$ pigments may possess such improved IR reflectance properties. Also, various types of substrates may be coated with the present pigments, such as wood, glass, ceramic, metal, plastic and composite substrates to provide an organic coating or paint which would contain and utilize the low heat buildup properties of the bismuth manganese oxide green pigment.

Table 1 lists visual characteristics of bismuth manganese oxide green pigments of the present invention using the conventional CIELAB color scale. Samples 1–4 listed in Table 1 were prepared by mixing 97.0 grams of $Bi_2O_3$ and 3.0 grams of $MnO_2$ and calcining the mixture at temperatures of 1,330 to 1,360° F. for 63 hours. After calcining, 12.3 grams of the pigment were mixed with 39.4 grams of alkyd/melamine premix, shaken and applied on a substrate with a draw down bar at a thickness of 1.5 mils. The samples were then baked for 30 minutes. The heat stability time and temperature for each sample are shown in parentheses.

TABLE 1

Color Characteristics of Bismuth Manganese Oxide Green Pigments

| Sample | L* | a* | b* | ΔL* | Δa* | Δb* | ΔE* |
|---|---|---|---|---|---|---|---|
| 1 (3 min/220° C.) | 55.52 | −9.19 | 22.60 | | | | |
| 2 (5 min/240° C.) | 56.23 | −9.13 | 23.41 | 0.71 | 0.06 | 0.81 | 1.08 |

TABLE 1-continued

Color Characteristics of Bismuth Manganese Oxide Green Pigments

| Sample | L* | a* | b* | ΔL* | Δa* | Δb* | ΔE* |
|---|---|---|---|---|---|---|---|
| 3 (5 min/280° C.) | 55.93 | −7.91 | 22.13 | 0.41 | 1.28 | −0.46 | 1.42 |
| 4 (5 min/200° C.) | 53.39 | −6.32 | 18.71 | −2.13 | 2.88 | −3.89 | 5.28 |

L* is lightness on a scale of 0 (black) to 100 (white);
a* is red/green value on a scale of −60 (green) to +60 (red);
b* is yellow/blue value on a scale of −60 (blue) to +60 (yellow);
ΔL* is the lightness or darkness difference between Sample 1 and Samples 2, 3 and 4;
Δa* is the red/green difference between Sample 1 and Samples 2, 3 and 4;
Δb* is the yellow/blue difference between Sample 1 and Samples 2, 3 and 4; and
ΔE* is the combined difference of the L, a, b values of Sample 1 and Samples 2, 3 and 4.

The bismuth manganese oxide pigments listed in Table 1 have high green values, and have moderate lightness values in the visible spectrum.

The visible and IR reflectance characteristics at wavelengths up to 1,100 nm for the $Bi_{12}MnO_{20}$ pigment (Sample No. 1), in comparison with three conventional green pigments (Samples Nos. 2–4), are shown in FIG. 1. The visible and IR measurements shown in FIG. 1 were made on a Datacolor Spectrophotometer. Higher IR reflectance values will yield lower heat buildup on a particular substrate.

Figure 2:
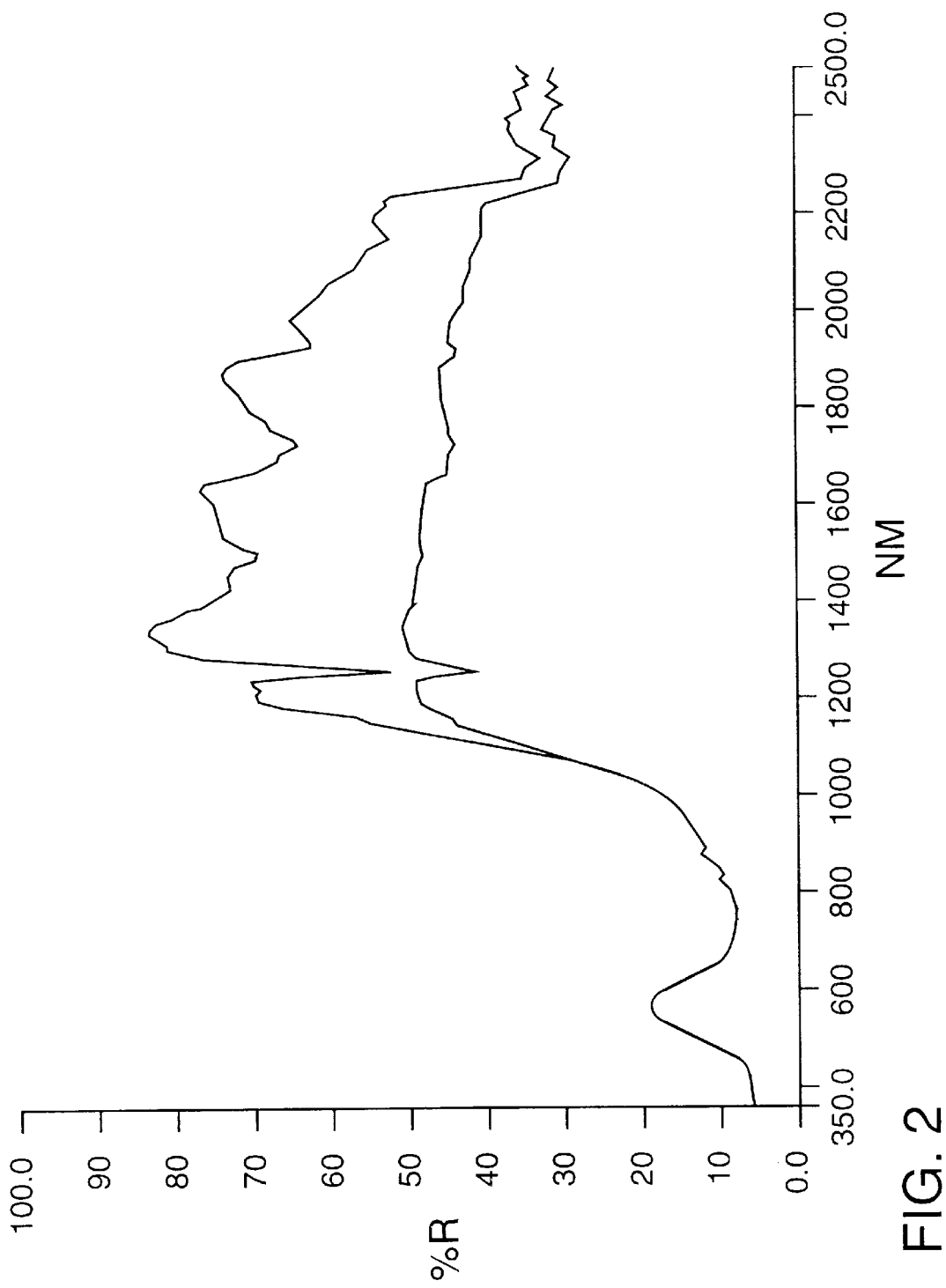
FIG. 2 is a graph illustrating visible and infrared reflectance characteristics at wavelengths of up to 2,500 nm for a bismuth manganese oxide green pigment of the present invention.

FIG. 2 shows the visible and IR reflectance characteristics at wavelengths up to 2,500 nm for the present $Bi_{12}MnO_{20}$ pigment. The upper trace shown in FIG. 2 represents the pigment coating over a white leneta substrate, while the lower trace represents the pigment coating over a black leneta substrate.

As illustrated in FIGS. 1 and 2, materials comprising the present bismuth manganese oxide green pigment possess comparable reflectance characteristics at visible wavelengths in comparison with conventional colorants, but possess increasing reflectance characteristics at IR wavelengths (e.g., of 1,100 to 2,500 nm) in comparison with materials comprising conventional green pigments. The present bismuth manganese oxide pigments thus appear relatively dark green at visible wavelengths and relatively light at IR wavelengths. These reflectance characteristics are highly advantageous in applications where heat buildup due to the absorption of IR radiation is to be minimized. The improved IR reflectance characteristics of the present bismuth manganese oxide green pigments is also highly advantageous in applications where detection by IR sensors is to be minimized.

The ability of the present bismuth manganese oxide pigments to reduce heat buildup from IR radiation is illustrated in Table 2, which lists values in degrees F. sample 5 includes bismuth manganese oxide green pigment of the present invention, while Samples 6, 7 and 8 comprise commercially available green pigments. Sample 9 comprises a commercially available black pigment. Specifically, Sample 5 comprises 25 weight percent bismuth manganese oxide green and 38 weight percent alkyd/melamine, balance xylene solvent; Sample 6 comprises 25 weight percent Green 10405 and 38 weight percent alkyd/melamine, balance xylene solvent; Sample 7 comprises 10 weight percent Phthalocyanine Green and 50 weight percent alkyd/melamine, balance xylene solvent; Sample 8 comprises 25 weight percent chrome oxide Green 6099 and 38 weight percent alkyd/melamine, balance xylene solvent; and Sample 9 comprises 2.5 weight percent carbon black in 97.5 weight percent rigid polyvinylchloride.

TABLE 2

Infrared Radiation Induced Heat Build Up

| Sample | Ta | Tm | ΔTlu | ΔTv | ΔTh |
|---|---|---|---|---|---|
| 5 | 72.3 | 149.3 | 77.0 | 40.6 | 49.4 |
| 6 | 72.5 | 165.2 | 92.7 | 48.8 | 59.4 |
| 7 | 72.4 | 154.8 | 82.4 | 43.4 | 52.8 |
| 8 | 71.9 | 155.2 | 83.3 | 43.9 | 53.4 |
| 9 | 72.4 | 212.8 | 140.4 | | |

Ta is the starting temperature or ambient temperature;
Tm is maximum temperature of sample;
ΔTlu is Tm minus Ta
ΔTv indicates vertical heat buildup per the 74F ASTM heat build-up test procedure; and
ΔTh indicates horizontal heat buildup per the 90F ASTM heat build-up procedure.

As shown in Table 2, Sample 5 comprising bismuth manganese oxide pigment in accordance with the present invention exhibits substantially decreased heat buildup when subjected to IR radiation in comparison with commercially available pigments. The ability of the present bismuth manganese oxide green pigments to reduce IR-induced heat buildup has particular significance for uses such as architectural, automotive, military, aerospace, industrial and electronics applications.

Whereas particular embodiments of this invention have been described above for purposes of illustration, it will be evident to those skilled in the art that numerous variations of the details of the present invention may be made without departing from the invention as defined in the appended claims.

What is claimed is:

1. A green bismuth manganese oxide pigment.
2. The pigment of claim 1, wherein the bismuth manganese oxide comprises $Bi_{12}MnO_{20}$.
3. The pigment of claim 1, wherein the bismuth manganese oxide comprises a cubic crystal structure.
4. The pigment of claim 1, wherein the pigment has an average particle size of from about 0.5 to about 20 microns.
5. A coating composition comprising:
   a liquid carrier; and
   a green bismuth manganese oxide pigment dispersed in the carrier.
6. The coating composition of claim 5, wherein the pigment comprises from about 0.1 to about 50 weight percent of the coating composition.
7. The coating composition of claim 5, wherein the liquid carrier comprises at least one solvent selected from pine oils, vegetable oils, mineral oils, synthetic resins and natural resins.
8. The coating composition of claim 5, wherein the bismuth manganese oxide comprises $Bi_{12}MnO_{20}$.
9. The coating composition of claim 5, wherein the bismuth manganese oxide comprises a cubic crystal structure.
10. A ceramic enamel composition comprising a green bismuth manganese oxide pigment.
11. The ceramic enamel composition of claim 10, wherein the pigment comprises from about 0.1 to about 70 weight percent of the ceramic enamel.
12. The ceramic enamel composition of claim 10, wherein the bismuth manganese oxide comprises $Bi_{12}MnO_{20}$.
13. The ceramic enamel composition of claim 10, wherein the bismuth manganese oxide comprises a cubic crystal structure.

14. An article comprising:

a substrate matrix; and a green bismuth manganese oxide pigment dispersed in the substrate matrix.

15. The article of claim 14, wherein the substrate matrix comprises polyvinylchloride.

16. The article of claim 14, wherein the article has an IR reflectance of greater than about 50 percent at a wavelength of 1,100 nm or greater.

17. An article comprising:

a substrate; and a coating including a pigment comprising green bismuth manganese oxide covering at least a portion of the substrate.

18. The article of claim 17, wherein the substrate comprises glass, ceramic, metal, plastic, carbon or composite.

19. The article of claim 17, wherein the substrate comprises glass.

20. The article of claim 17, wherein the coating has an IR reflectance of greater than about 50 percent at a wavelength of 1,100 nm or greater.

21. A method of making a green bismuth manganese oxide pigment comprising:

mixing powders of bismuth oxide and manganese oxide; and calcining the mixture.

22. The method of claim 21, further comprising mixing the bismuth oxide and manganese oxide powders in a weight ratio which produces $Bi_{12}MnO_{20}$ upon the calcination of the mixture.

23. The method of claim 21, wherein the bismuth manganese oxide comprises a cubic crystal structure.

24. The method of claim 21, further comprising comminuting the calcined mixture to an average particle size of from about 0.5 to about 5 microns.

25. A method of coloring a substrate comprising:

providing a substrate; and adding a green bismuth manganese oxide pigment to the substrate.

26. The method of claim 25, wherein the pigment is added to the substrate by dispersing the pigment in a matrix of the substrate.

27. The method of claim 25, wherein the pigment is added as a coating comprised of the pigment on at least a portion of the substrate.

28. The method of claim 25, wherein the bismuth manganese oxide comprises $Bi_{12}MnO_{20}$.

29. The method of claim 25, wherein the bismuth manganese oxide comprises a cubic crystal structure.

* * * * *

UNITED STATES PATENT AND TRADEMARK OFFICE
CERTIFICATE OF CORRECTION

PATENT NO.   : 6,171,383 B1
DATED        : January 9, 2001
INVENTOR(S)  : George Emil Sakoske et al.

It is certified that error appears in the above-identified patent and that said Letters Patent is hereby corrected as shown below:

Title page,
OTHER PUBLICATIONS equation "Bi2O3-Me2O3 (Fe, Al, Ga, Mn)" should read
-- $Bi_2O_3-Me_2O_3$ ($Fe^{3+}$, $Al^{3+}$, $Ga^{3+}$, $Mn^{3+}$, $Mn^{3+}$) --.
Column 2,
OTHER PUBLICATIONS, line 4, "Badikova" should read -- Baidikova --.

Column 1,
Line 19, "U.S. Patent 5,336,612" should read -- U.S. Patent 5,336,312 --.

Column 5,
Last line of Table 1, under Sample column "4(5min/200° C)" should read, -- 4 (5 min 300°C.) --.
Line 52, "F. sample" should read -- F. Sample --.

Signed and Sealed this

Fifth Day of March, 2002

*Attest:*

*Attesting Officer*

JAMES E. ROGAN
*Director of the United States Patent and Trademark Office*